E. W. SAGERT.
GARDEN TOOL.
APPLICATION FILED JULY 1, 1919.
1,334,969.
Patented Mar. 30, 1920.
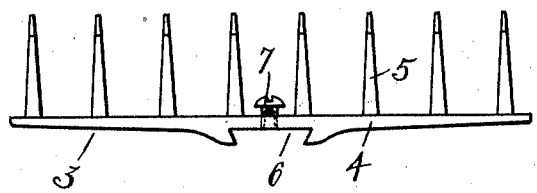
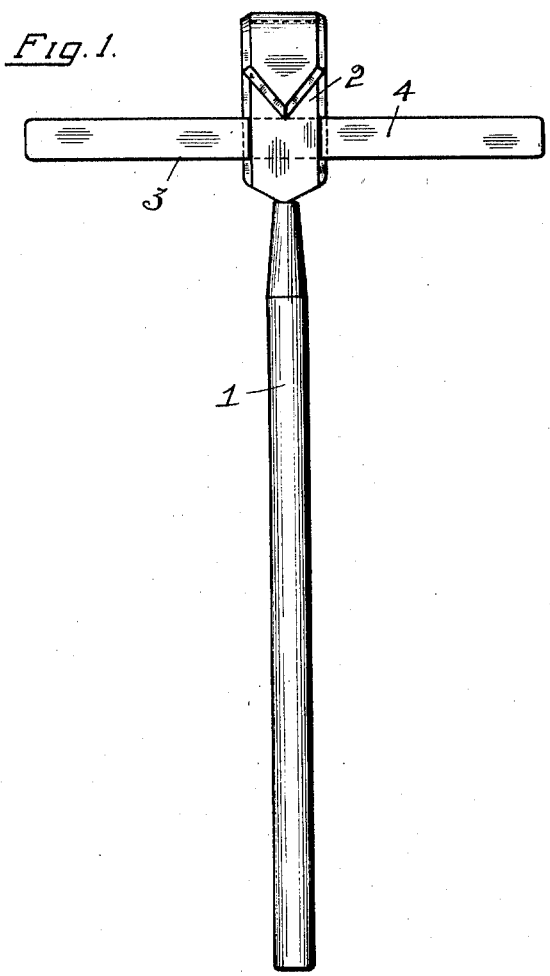
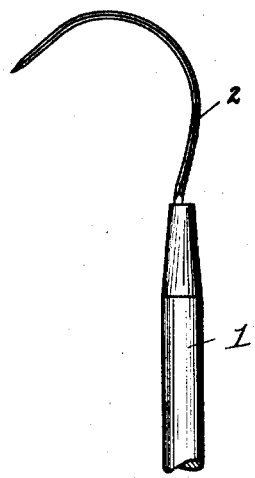
INVENTOR
Edward Sagert,
By Owen, Owen & Crampton.
His attys.

UNITED STATES PATENT OFFICE.

EDWARD W. SAGERT, OF ARCHBOLD, OHIO.

GARDEN-TOOL.

1,334,969.      Specification of Letters Patent.      Patented Mar. 30, 1920.

Application filed July 1, 1919. Serial No. 307,968.

*To all whom it may concern:*

Be it known that I, EDWARD W. SAGERT, a citizen of the United States, and a resident of Archbold, in the county of Fulton and State of Ohio, have invented a certain new and useful Garden-Tool; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to garden tools, and has for its object the provision of a garden tool, a hoe, in the present instance, having a curved or angular shank portion to which a rake head may be releasably attached and on which it may be angularly adjusted with respect to the handle to vary the inclination of the rake head teeth relative to the handle.

The invention is fully described in the following specification, and while in its broader aspect it is capable of embodiment in numerous forms, a preferred embodiment thereof is illustrated in the accompanying drawings, in which, Figure 1 is an elevation of a tool embodying the invention and having a rake head attached thereto. Fig. 2 is an elevation of the rake head removed from the tool, and Fig. 3 is a side elevation of the tool with the handle partly broken away.

Referring to the drawings, 1 designates a handle from one end of which projects a hoe blade 2, which has its blade portion of narrow elongated form, beginning adjacent to the handle and extending longitudinally therefrom and thence curving laterally and forwardly relative thereto in the manner of a spring harrow tooth, the outer end of the blade being preferably of wedge or V-form.

A rake head 3, having the cross-bar 4 and teeth 5, is adapted to be releasably and adjustably mounted on the blade 2 and for such purpose is provided on the back of its cross-bar at the center thereof with a transverse groove 6, preferably of dove-tail form, for receiving the hoe blade. The rake head 3 may be placed in any desired position on the blade 2, and if attached to the portion of the blade which is adjacent to the handle 1 or which extends longitudinally therefrom the teeth of the rake will be disposed substantially at rightangles to the handle axis and if placed in engagement with the curved portion of the blade the teeth will bear a predetermined angular relation to the handle, as is apparent, so as to adapt or incline the rake teeth to suit the work to be performed or to suit the inclination to which the handle is held by the user. The rake head may be secured in adjusted position by a set screw 7, which is threaded through the cross-bar 4 in position to have binding contact with the blade 2.

It is evident that I have provided a simple and efficient form of tool which may be used either as a hoe or a rake, and which is adapted to have its rake head easily and quickly adjusted to place its teeth at any desired angular relation to the handle.

I wish it understood that my invention is not limited to any specific construction or arrangement of the parts except in so far as such limitations are specified in the claims.

Having thus described my invention, what I claim as new and desire to secure by Letters Patent, is,

1. The combination with a hoe having its blade projecting longitudinally from the end of its handle and thence curving laterally therefrom, of a rake head having its cross-bar mounted on the blade transversely thereof and slidingly adjustable longitudinally of the blade to vary the angular relation of the rake teeth to the handle axis, and means for securing the rake head in adjusted relation to the blade.

2. The combination with a hoe having its blade projecting longitudinally from the end of its handle and thence curving laterally therefrom, of a rake head having its cross-bar provided centrally with a transverse notch for receiving the blade and permitting adjustment of the rake head longitudinally of the blade, and means for securing the rake head in adjusted relation to the blade.

In testimony whereof I have hereunto signed my name to this specification.

EDWARD W. SAGERT.